United States Patent [19]

Bond

[11] Patent Number: 4,485,685
[45] Date of Patent: Dec. 4, 1984

[54] STRAIGHT LINE LINK MECHANISM

[76] Inventor: Irvin D. Bond, 10270 Allen Rd., Clarkston, Mich. 48016

[21] Appl. No.: 368,992

[22] Filed: Apr. 16, 1982

Related U.S. Application Data

[63] Continuation-in-part of Ser. No. 256,390, Apr. 22, 1981, Pat. No. 4,400,985.

[51] Int. Cl.³ ............................................. F16H 21/04
[52] U.S. Cl. ...................................................... 74/103
[58] Field of Search ..................... 74/103, 105, 110; 173/38

[56] References Cited

U.S. PATENT DOCUMENTS

| | | | |
|---|---|---|---|
| 2,549,562 | 4/1951 | Baker | 74/103 |
| 3,426,994 | 2/1969 | Daniel | 74/103 |
| 3,484,004 | 12/1969 | Hughey | 74/103 |
| 3,501,120 | 3/1970 | Daniel | 74/103 |

FOREIGN PATENT DOCUMENTS

| | | | |
|---|---|---|---|
| 101051 | 5/1937 | Australia | 74/103 |
| 145984 | 6/1954 | Sweden | 74/103 |

OTHER PUBLICATIONS

*Mechanisms, Linkages & Mechanical Controls,* Edited by N. P. Chironis, 1965, pp. 72–77.

*Primary Examiner*—Lawrence J. Staab
*Attorney, Agent, or Firm*—Charles W. Chandler

[57] ABSTRACT

A straight line link mechanism in which a series of pivotally connected links are connected between a support and a control member such as one of the links is reciprocated in a pivotal motion by a piston and cylinder actuator, the controlled member moves along a linear path of motion.

5 Claims, 5 Drawing Figures

STRAIGHT LINE LINK MECHANISM

BACKGROUND OF THE INVENTION

This invention is related to linkage mechanisms for moving a controlled member along a substantially linear path of motion, and more particularily to a linkage in which the applied motion is provided by a piston and cylinder actuator so as to move the controlled member along a substantially linear path of motion, but at a rate of motion that depends upon the shape of a cam engaged with the piston rod.

Some industrial applications require a transfer member to be moved along a substantially linear path in a reciprocal motion. It is desirable that the rate of motion be varied as the transfer member is moved from one end toward the opposite end of its path of motion.

SUMMARY OF THE INVENTION

The broad purpose of the present invention is to provide a linkage mechanism in which one of the links is connected to a controlled member which, for example, may be used for picking up a metal stamping, and moving it along a linear path, the input motion being provided by a piston and cylinder actuator. The piston rod has a cam roller mounted in a slotted arm that is pivotally connected to one of the links in such a manner that as the piston rod is extended from the cylinder, it pivots the arm in a motion in which the roller moves toward one end of the arm, and as the piston rod is moved in the other direction, the roller moves towards the opposite end of the arm. The piston rod has a second roller that rides on a cam in such a manner that as the piston rod is extended at a uniform rate of motion, the controlled member increases its rate of motion during a portion of its path then reduces its rate of motion during the remainder of its path. The rate of motion of the controlled member varies according to the shape of the cam.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
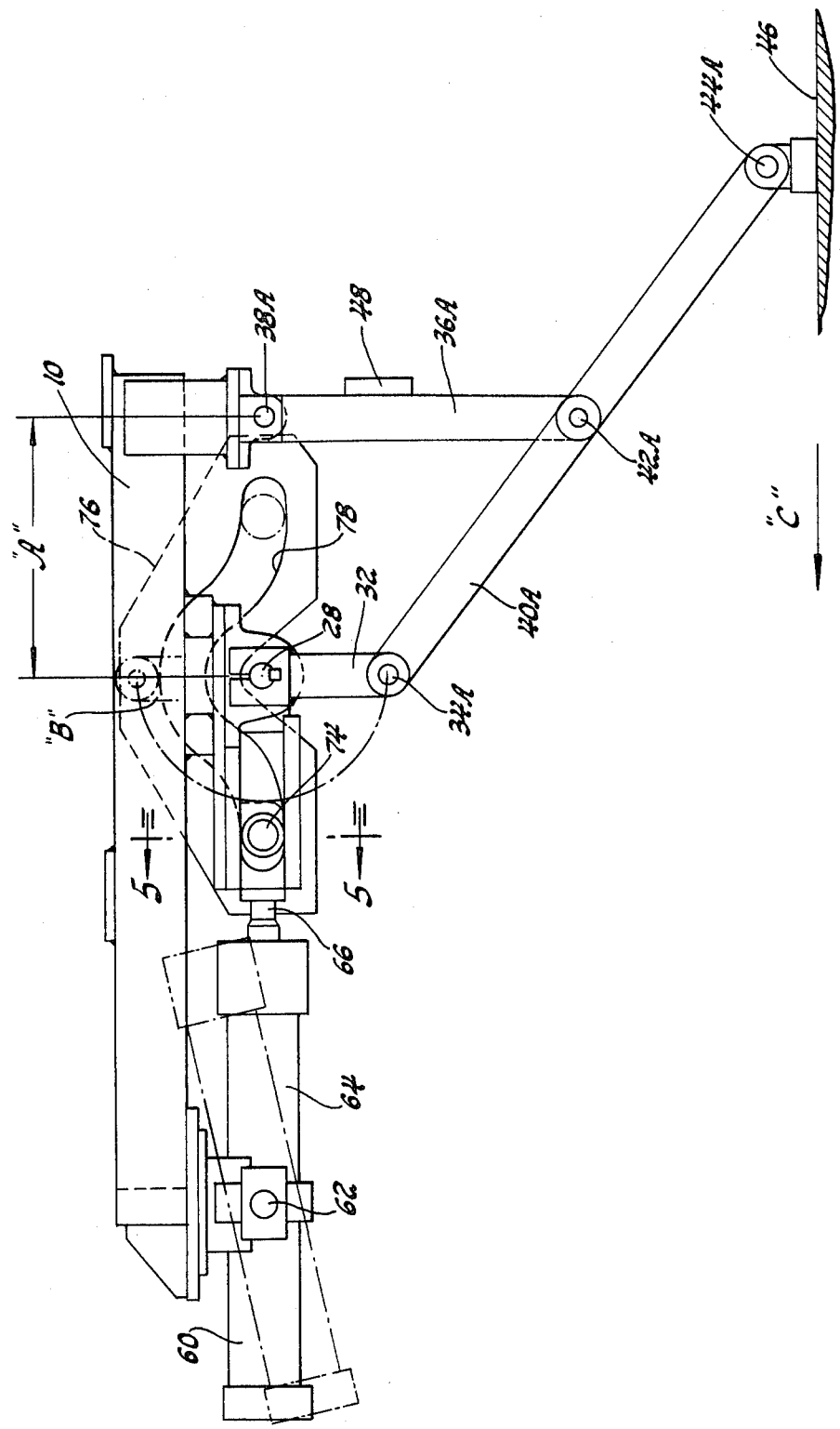
FIG. 1 is an elevational view showing the preferred embodiment of the invention in one position.

Referring to the drawings, an overhead frame 10 has a pair of short legs 12 and 14 supporting bearing means 16 and 18, respectfully. Frame 10 has a second pair of legs 20 and 22 supporting bearing means 24 and 26, respectfully. A shaft 28 has its ends supported on bearing means 16 and 24, and a second shaft 30, aligned with shaft 28, is supported by bearings means 18 and 26.

Figure 2:
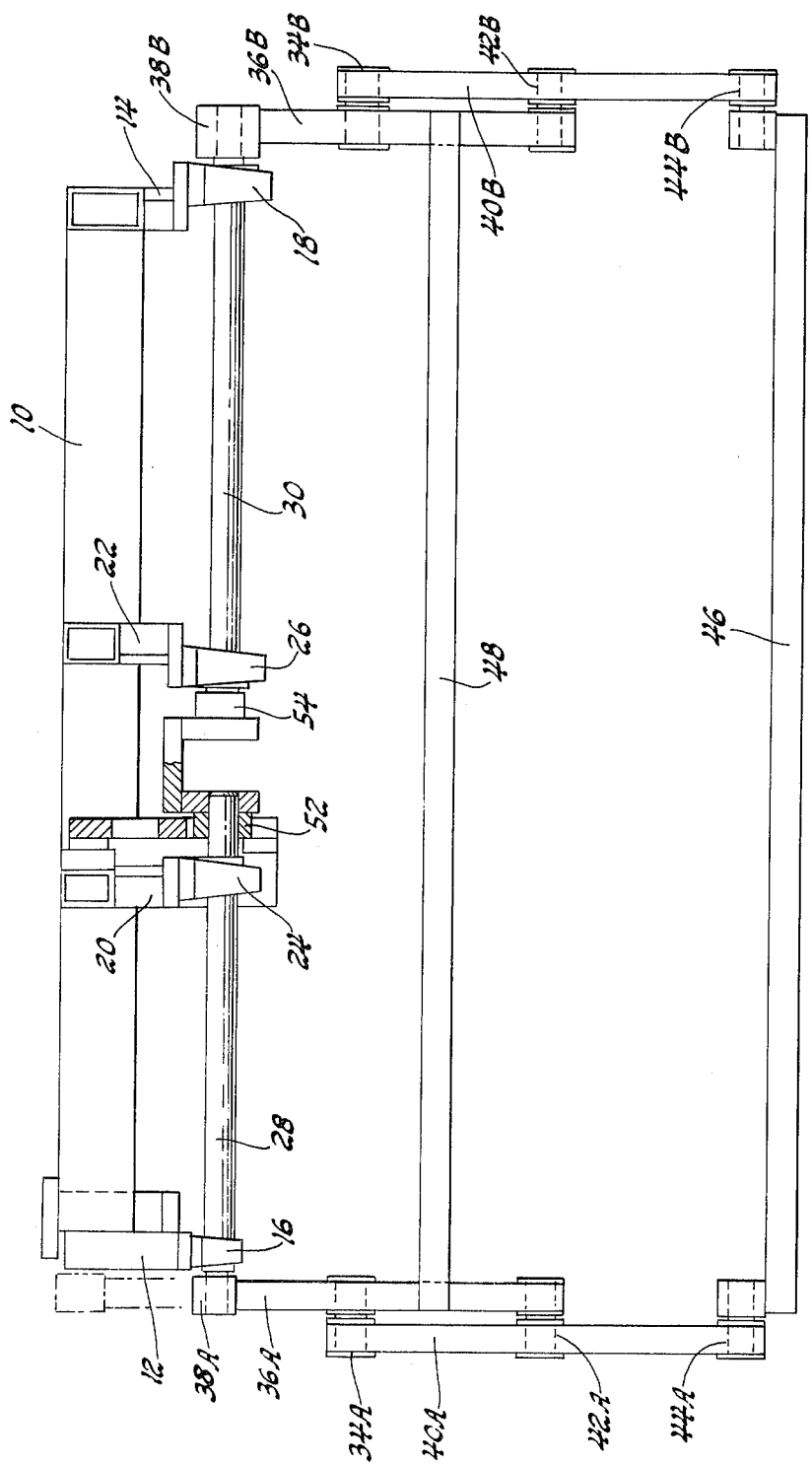
FIG. 2 is an end view of the embodiment of FIG. 1 with portions of the apparatus being illustrated in section.
Figure 3:
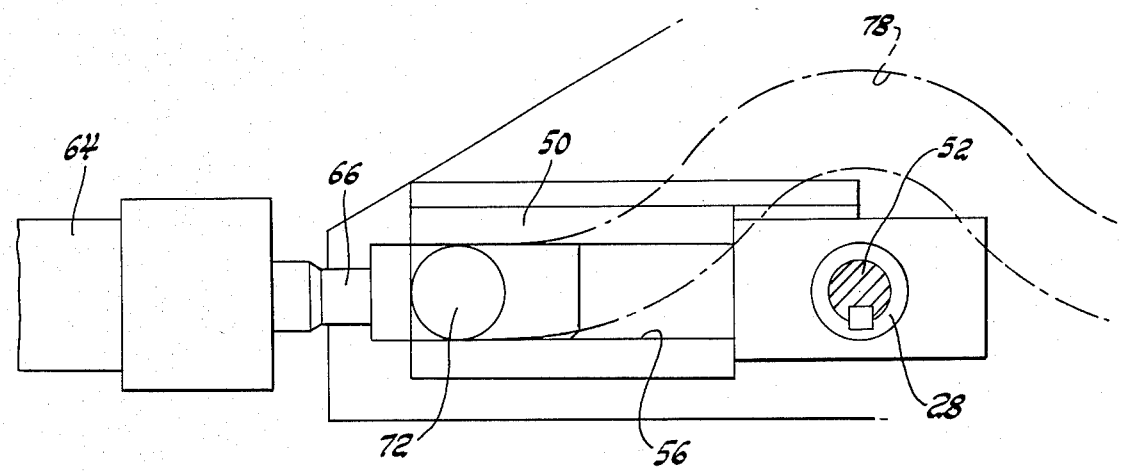
FIG. 3 is a fragmentary view showing the manner in which the piston rod is connected to the actuator arm and to the cam.
Figure 4:
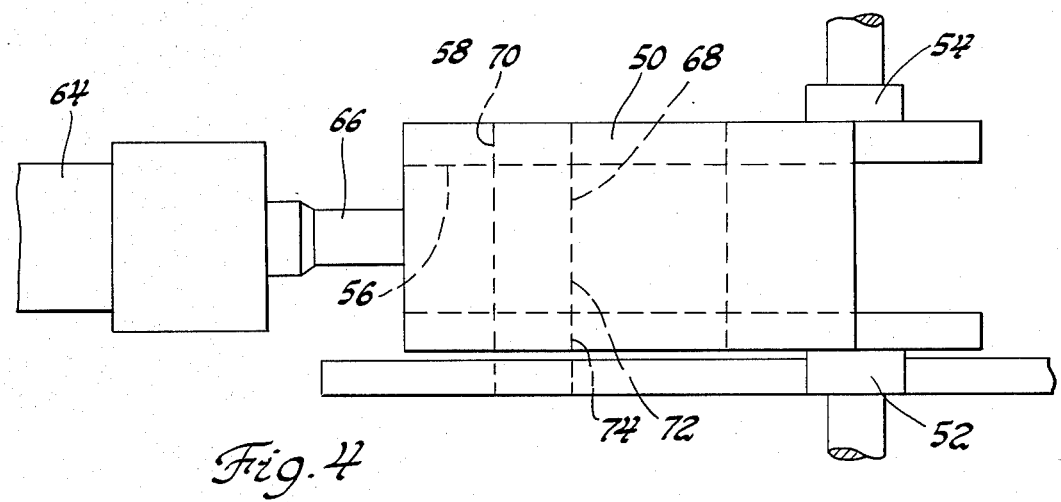
FIG. 4 is a plan view of FIG. 3.
Figure 5:
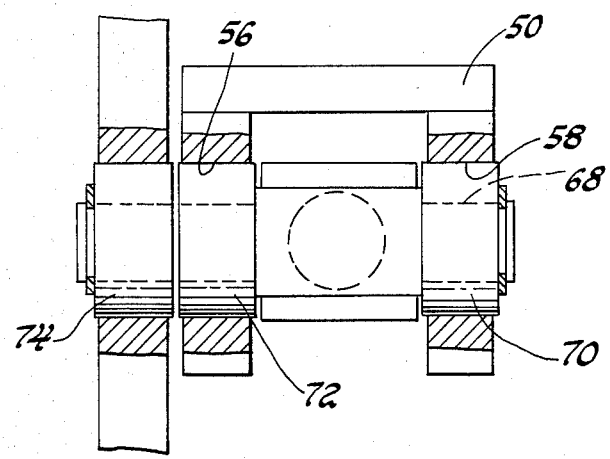
FIG. 5 is a view as seen along lines 5—5 of FIG. 1.

A pair of links 32A (only one shown) are mounted on the outer ends of shafts 28 and 30. Pivot means 34A and 34B are connected to the lower ends of links 32A. Links 32A are keyed to their respective shafts so that they are pivotally mounted on frame 10. A second pair of links 36A and 36B are mounted on the frame by pivot means 38A and 38B. Link means 36A and 36B have an equal length while the distance between shaft 28 and pivot means 38A is equal to a predetermined distance "A". The distance from shaft 28 to pivot means 34A is equal to $\frac{1}{2}$ A. A third pair of links 40A and 40B are mounted on a opposite sides of the frame as illustrated in FIGS. 1 and 2.

The upper ends of links 40A and 40B are connected to pivot means 34A and 34B, respectively. A pair of pivot means 42A and 42B connect the lower end of links 36A and 36B to the mid section of links 40A and 40B, respectively. The distance between pivot means 34A and 42A is equal to 1.25 "A". The connection between 36B and 40B is identical to the arrangement between 36A and 40A.

Pivot means 44A and 44B connect the lower ends of links 40A and 40B to a controlled member 46 which may be part of an automation assembly or other similar device intended to be moved along a substantially horizontal, linear path of motion. An arm 48 has its ends connected to links 36A and 36B so that they pivot together as a unit. It is understood that the companion link of link 32A, links 36B and 40B, together with their connecting pivot means are such that they move as a unit together with links 32A, 36A and 40A.

Referring to FIGS. 2, 3, 4 and 5, an elongated arm 50 has a pair of collars 52 and 54 connected to shafts 28 and 30, respectively. The arrangement is such that as arm 50 is pivoted, it rotates shafts 28 and 30 and thereby moves their connecting links. Arm 50 has an elongated pair of slots 56 and 58.

Referring to FIG. 1, pneumatic actuator 60 is mounted by pivot means 62 to support 10. The actuator comprises a cylinder 64 and an extensible piston rod 66 adapted to move between extended and retracted positions.

A short shaft 68 is carried on the outer end of the piston rod, and supports cam rollers 70, 72 and 74. Rollers 70 and 72 are mounted in slots 58 and 56 respectively of arm 50. The arrangement is such that as the piston rod is moved from a fully retracted to a fully extended position, it moves along the slot toward shaft 28 and 30. Similarly as the piston rod is moved from its extended toward a fully retracted position, it moves toward the outer end of the slot away from shafts 28 and 33.

A cam plate 76 is mounted on support 10 adjacent arm 50. The cam plate has a cam contour in the form of a slot 78 having its ends on opposite sides of shaft 28. Cam roller 74 is disposed in slot 78 such that as the piston rod is extended it cams the arm about shaft 28 at a rate of motion depending upon the shape of the cam contour. Since the arm is connected to both shafts 28 and 30, the motion of the piston rod is transferred to links connected to controlled member 46.

As illustrated in FIG. 1, as the piston rod is extended from its fully retracted position to its fully extended position, it moves links 32A from its downward position to its upward position, (illustrated in phantom) in a 180 degree motion. This, in turn moves controlled member 46 in a linear, horizontal path of motion toward the left as indicated at "C" in FIG. 1. As the piston rod is moved from its fully extended position toward its fully retracted position, roller 74 moves from the right end of slot 78 toward the left end, to move the controlled member 46 in a horizontal motion toward the right. The cam is shaped in such a manner that as the controlled member moves from its initial extreme position on the right toward the left, it increases its rate of motion and then reduces its rate of motion as it reaches its leftmost position. Similarly as the piston rod is moved at a uniform rate of motion from its retracted position towards its fully extended position, the controlled member initially increases its rate of motion and then decreases its rate of motion.

Thus I have described an improved linear motion mechanism in which the input motion is provided by a piston and cylinder actuator having a piston moved at a uniform rate of motion through a linkage to provide a controlled member with a variable rate of motion, depending upon the shape of the cam contour.

Having described my invention I claim:

1. A straight line link mechanism comprising:
   a support;
   a first link;
   first pivot means connecting the first link to the support for pivotal motion;
   a second link;
   second pivot means connecting the second link to the support for pivotal motion, the second pivot means being disposed a first distance from the first pivot means;
   a third link;
   third pivot means connecting the third link to the first link for relative pivotal motion a distance from the first pivot means of about one-half said first distance;
   fourth pivot means connecting the third link for relative pivotal motion to the second link a distance from said third pivot means of about 1.25 times said first distance;
   said fourth pivot means being connected to the third link a distance from the second pivot means of about 1.25 times said first distance;
   a controlled member, and means pivotally connecting the controlled member to the third link a distance of about 1.25 times said first distance from the fourth pivot means;
   an actuator means including a cylinder mounted on the support, and a piston rod extensible from the cylinder at a uniform rate of motion; and
   cam means connecting the first pivot means to the piston rod to pivot the first link from a first position to a second position such as the first link is moved by the actuator means in a pivotal motion with respect to the support, the controlled member is moved along a substantially linear path of motion.

2. A combination as defined in claim 1, in which said cam means comprises a cam member having a predetermined contour such as that the piston rod is moved from a first position toward a second position at a uniform rate of motion, the controlled member moves along a linear path of motion at a rate of motion depending upon the cam contour.

3. A combination as defined in claim 1, including an arm having one end connected to the first pivot means so as to pivot therewith; connection means connecting the arm to the piston rod such that as it is moved in a first direction, the connection means moves along the arm toward the first pivot means, and as the piston rod is moved in the opposite direction, the connection means moves along the arm in the opposite direction away from the first pivot means.

4. A combination as defined in claim 1, in which the controlled member is moved along a path of motion in the opposite direction as the first link is pivoted in the opposite direction.

5. A combination as defined in claim 1, in which the controlled member moves at an increased rate of motion and then at a reduced rate of motion as the piston rod is moved from said first position to said second position at a uniform rate of motion.

* * * * *